United States Patent
Okamura et al.

[11] Patent Number: 5,937,738
[45] Date of Patent: Aug. 17, 1999

[54] COFFEE EXTRACTING APPARATUS FOR EXTRACTING COFFEE ESSENCE WITH USE OF COMPRESSED AIR STORED IN AN ACCUMULATOR

[75] Inventors: Karin Okamura, Isesaki; Isao Katou, Ota; Makoto Kobayashi, Takasaki; Akio Kawabata, Isesaki, all of Japan

[73] Assignee: Sanden Corporation, Japan

[21] Appl. No.: 08/872,139

[22] Filed: Jun. 10, 1997

[30] Foreign Application Priority Data

Jun. 11, 1996 [JP] Japan .................................. 8-148857

[51] Int. Cl.$^6$ ...................................... A47J 31/32
[52] U.S. Cl. .................. 99/302 R; 99/287; 99/302 P; 99/289 T
[58] Field of Search .................. 99/287, 300, 302 R, 99/289 T, 302 P, 292

[56] References Cited

U.S. PATENT DOCUMENTS

| | | | |
|---|---|---|---|
| 3,844,206 | 10/1974 | Weber | 99/300 X |
| 4,505,191 | 3/1985 | Longo | 99/300 |
| 4,984,511 | 1/1991 | Sekiguchi | 99/287 |

FOREIGN PATENT DOCUMENTS

| | | | |
|---|---|---|---|
| 516884 | 12/1992 | European Pat. Off. | 99/287 |
| 546498 | 6/1993 | European Pat. Off. . | |
| 368859 | 11/1982 | Germany . | |
| 9214283 | 2/1993 | Germany . | |

*Primary Examiner*—Reginald L. Alexander
*Attorney, Agent, or Firm*—Banner & Witcoff, Ltd.

[57] ABSTRACT

In a coffee extracting apparatus for extracting coffee essence from the coffee material within an extracting device (10) with use of compressed air generated in an air compressor (11), use is made of an accumulator (23) for accumulating the compressed air. The accumulator is connected to an air passage (12) which connects the extracting device with the air compressor. An air control valve (22) is disposed in the air passage and is for controlling flow of the compressed air to make the accumulator accumulate the compressed air.

4 Claims, 2 Drawing Sheets

COFFEE EXTRACTING APPARATUS FOR EXTRACTING COFFEE ESSENCE WITH USE OF COMPRESSED AIR STORED IN AN ACCUMULATOR

BACKGROUND OF THE INVENTION

This invention relates to a coffee extracting apparatus for extracting coffee essence from coffee material with use of compressed air.

A conventional coffee extracting apparatus of the type comprises an extracting device supplied with hot water for extracting coffee essence from coffee material to produce liquid coffee extract, an air compressor for generating compressed air, and an air passage connected between the extracting device and the air compressor for conducting the compressed air from the air compressor into the extracting device.

After the extracting device is supplied with hot water in addition to the coffee material, the air compressor is actuated to supply the compressed air via the air passage into the extracting device thereby stirring the coffee material with the hot water. By effecting extraction of the coffee essence in a pressed state, the time for the extraction of the coffee essence is curtailed as compared with the extraction performed under normal pressure.

However, the conventional coffee extracting apparatus is at a disadvantage in failing to attain any conspicuous effect of curtailing the time for the extraction of coffee essence. This is because it implements the extraction of coffee essence by actuating the air compressor in each round of coffee extraction, feeding the compressed air of the air compressor directly to the extracting device, and gradually increasing the air pressure in the extracting device and, as a result, consumes time in increasing the inner pressure of the extracting device to a prescribed level.

SUMMARY OF THE INVENTION

It is therefore an object of the present invention to provide a coffee extracting apparatus in which the time for the coffee extraction is decreased as compared with the conventional equivalent.

Other objects of this invention will be clear from the description proceeds.

According to this invention, there is provided a coffee extracting apparatus comprising an extracting device supplied with hot water for extracting coffee essence from coffee material to produce liquid coffee extract, an air compressor for generating compressed air, and an air passage connected between the extracting device and the air compressor for conducting the compressed air from the air compressor into the extracting device. The coffee extracting apparatus further comprises an air control valve connected to the air passage for controlling flow of the compressed air in the air passage and an accumulator connected to the air passage for accumulating the compressed air with control of the flow of the compressed air by the air control valve.

DESCRIPTION OF THE PREFERRED EMBODIMENT

Figure 1:
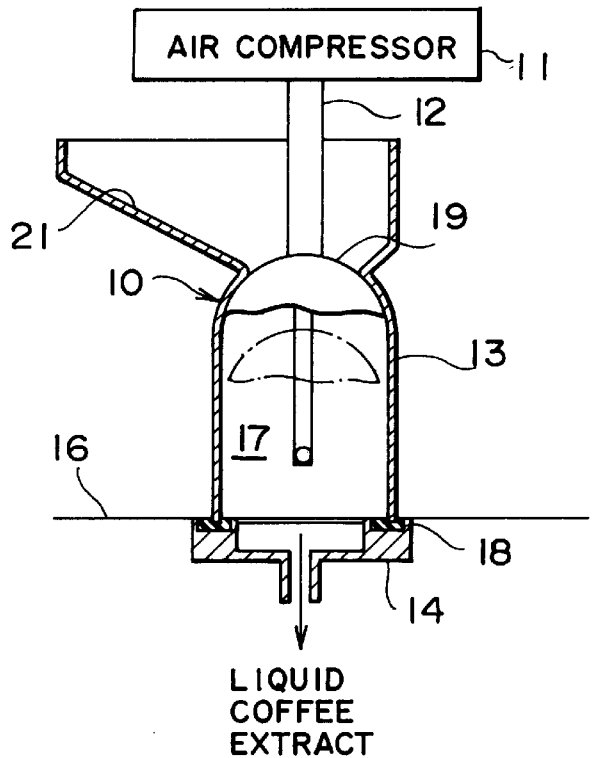
FIG. 1 is a vertical cross sectional view of a conventional coffee extracting apparatus.

Referring to FIG. 1, description will be made at first as regards a conventional coffee extracting apparatus for better understanding of this invention.

The conventional coffee extracting apparatus comprises an extracting device 10 supplied with hot water for extracting coffee essence from coffee material or coffee powder to produce liquid coffee extract, an air compressor 11 for generating compressed air, and an air passage 12 connected between the extracting device 10 and the air compressor 11 for conducting the compressed air from the air compressor 11 into the extracting device 10. The extracting device 10 comprises a chamber wall 13 having upper and lower openings and a filter support 14 for supporting a filmy filter member 16 to cover the lower opening of the chamber wall 13. The chamber wall 13 defines an extracting chamber 17 in cooperation with the filter member 16. On extracting the coffee essence, the hot water, the coffee material, and the compressed air are supplied to the extracting chamber 17. After extracting the coffee essence, the liquid coffee extract is filtered by the filter member 16.

In addition, a seal member 18 is inserted between the chamber wall 13 and the filter support 14. The filter support 14 supports the filter member 16 and is pressed against the lower opening of the chamber wall 13 through the seal member 18. As a result, the filter member 16 has a part which is nipped between the lower end of the chamber wall 13 and the filter support 14 with being sealed.

The conventional coffee extracting apparatus further comprises a water control valve 19 adapted to open and close the lower opening of the chamber wall 13. The water control valve 19 is for controlling supply of the hot water and the coffee material into the extracting chamber 17 through a guide member 21.

The extraction of coffee essence is attained by opening the water control valve 19 as indicated by an alternate dot and dash line in FIG. 1, feeding the coffee material and the hot water to the extracting chamber 17, closing the water control valve 19 as indicated by a continuous line in FIG. 1, setting the air compressor 11 actuating, and supplying the compressed air via the air passage 12 into the extracting chamber 17 thereby stirring the coffee material with the hot water.

The liquid coffee extract is passed through the filter member 16 and taken out via an opening of the filter support 14. After the extraction of coffee essence, the filter member 16 is separated from the extracting device 10 and is moved sideway with now carrying coffee grounds.

With this structure, the extraction is carried out in a pressed state. Therefore, the time for the extraction of coffee essence is curtailed as compared with the extraction performed under normal pressure.

Figure 2:
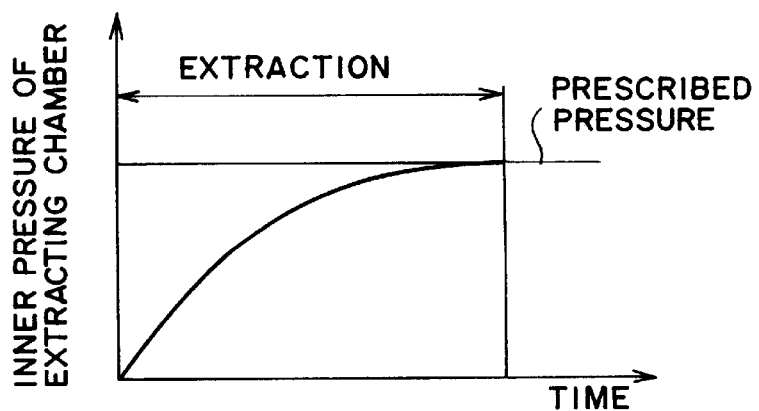
FIG. 2 is a diagram illustrating the change in the inner pressure of an extracting device included in the conventional coffee extracting apparatus of FIG. 1.

However, the conventional coffee extracting apparatus is at a disadvantage in failing to attain any conspicuous effect of curtailing the time for the extraction of coffee essence. This is because the extraction is carried with gradually increasing the inner pressure of the extracting chamber 17 illustrated in FIG. 2. It should be noted that relatively long time is required in increasing the inner pressure of the extracting chamber 17 to a prescribed level.

Figure 3:
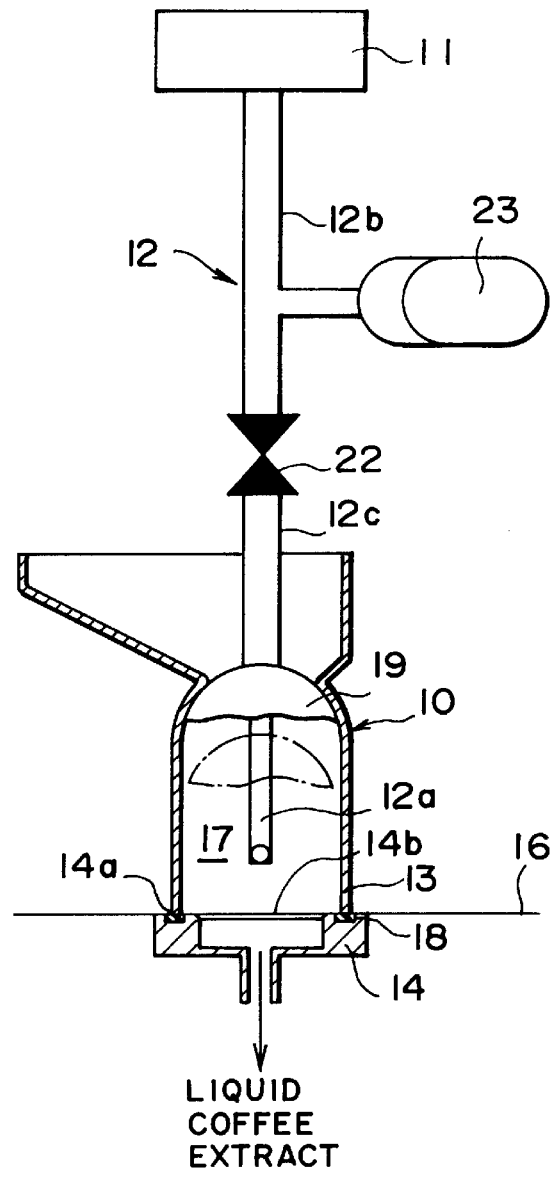
FIG. 3 is a vertical cross sectional view of a coffee extracting apparatus according to an embodiment of this invention.

Turning to FIG. 3, the description will be made as regards a coffee extracting apparatus according to an embodiment of this invention. The coffee extracting apparatus is of a percolating type known in the art. Similar parts are designated by like reference numerals.

In the coffee extracting apparatus, the filter support 14 is cylindrical and has an upper surface formed with a circular groove 14a in which the seal member 18 is placed. On the upper surface of the filter support 14, a mesh portion 14b horizontally extends inside the circular groove 14a. The filter member 16 is of a paper type. The air passage 12 penetrates the water control valve 19 to extend as an air nozzle 12a in the extracting chamber 17.

The coffee extracting apparatus further comprises an air control valve 22 and an accumulator 23. The air control valve 22 is disposed in the air passage 12 and is for controlling flow of the compressed air in the air passage 12. Accordingly, the air control valve 22 divides the air passage 12 into first and second passage portions 12b and 12c. The first passage portion 12b is defined between the air compressor 11 and the air control valve 22. The second passage portion 12c is defined between the extracting device 10 or the air nozzle 12a and the air control valve 22. The accumulator 23 is connected to the first passage portion 12b.

In the coffee extracting apparatus, the air compressor 11 is actuated in advance of the coffee extraction to store the compressed air in the accumulator 23 with closing the air control valve 22. When extracting the coffee essence, the filter support 14 is pressed against the lower end of the chamber wall 13 together with the filter member 16. The lower end of the chamber wall 13 is pressed against the seal member 18 in conjunction with the filter member 16. The part of the filter member 16 is nipped between the lower end of the chamber wall 13 and the filter support 14 with being sealed. The water control valve 19 is opened as indicated by an alternate dot and dash line in FIG. 3. In this state, the coffee powder and the hot water are supplied to the extracting device 10. After that, the water control valve 19 is closed as indicated by a continuous line in FIG. 3.

When the air control valve 22 is opened, the compressed air stored in the accumulator 23 is supplied via the air passage 12 into the extracting chamber 17. The compressed air makes the coffee powder and the hot water be stirred in the extracting chamber 17. As a result, the coffee powder and the hot water are mixed in a fluidized state to extract the coffee essence from the coffee powder. The liquid coffee extract is passed through the filter member 16 and taken out via the opening of the filter support 14. After the extraction of coffee essence, the filter member 16 and the filter support 14 are separated from the chamber wall 13. The filter member 16 now carries coffee grounds thereon to move sideways until the filter member 16 and the coffee grounds are discarded together.

Figure 4:
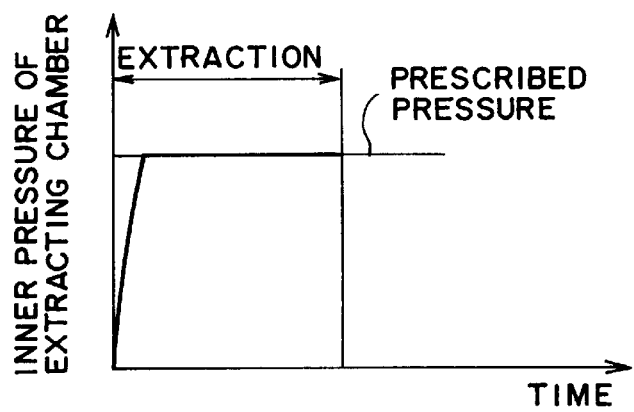
FIG. 4 is a diagram illustrating the change in the inner pressure of an extracting device included in the coffee extracting apparatus of FIG. 3.

In the coffee extracting apparatus, the air pressure of the extracting chamber 17 rises immediately to the prescribed level as illustrated in FIG. 4. This is because the coffee extracting apparatus preparatorily actuates the air compressor 11 to store the compressed air in the accumulator 23 and, at the time of the extraction of coffee essence, opens the air control valve 22 to supply the compressed air stored in the accumulator 23 to the extracting chamber 17. As a result, the coffee extracting apparatus allows a decrease in the time for coffee extraction as compared with the conventional equivalent.

When the compressed air of a volume necessary for several rounds of coffee extraction is stored in advance in the accumulator 23, the number of actuations of the air compressor 11 can be decreased. As a result, the power consumption is cut and the service life of the air compressor 11 is elongated.

In the coffee extracting apparatus, even when the air compressor 11 is smaller than that which is used in the conventional equivalent, the compressed air can be stored in the accumulator 23 by actuating the small air compressor 11 for a long time while the extracting device 10 is at rest. In addition, the inner pressure of the extracting chamber 17 can be quickly raised to the prescribed level by using the compressed air stored in the accumulator 23. The coffee extracting apparatus, therefore, permits a decrease in the size of the air compressor 11 as compared with that of the conventional equivalent.

While the present invention has thus far been described in connection with a single embodiment thereof, it will readily be possible for those skilled in the art to put this invention into practice in various other manners. For example, use may be made as the seal member a selected one of a packing and an O ring in the manner known in the art. The filter member may be of plastic film. The entire disclosure of Japanese Patent Application No. 8-148857 filed on Jun. 11, 1996 including specification, claims, drawings and summary are incorporated herein by reference in its entirety.

What is claimed is:

1. A coffee extracting apparatus comprising an extracting device supplied with hot water for extracting coffee essence from coffee material to produce liquid coffee extract, an air compressor for generating compressed air, and an air passage connected between said extracting device and said air compressor for conducting said compressed air from said air compressor into said extracting device, said coffee extracting apparatus further comprising:

an air control valve disposed in said air passage for controlling flow of said compressed air in said air passage;

said air passage having first and second passage portions, said first passage portion extending between said air compressor and said air control valve, and said second passage portion extending directly between said extracting device and said control valve; and an accumulator connected to said first passage portion for accumulating said compressed air with control of said flow of compressed air by said air control valve and for supplying compressed air solely to said extracting device.

2. A coffee extracting apparatus as claimed in claim 1, further comprising a water control valve disposed in said extracting device for controlling supply of each of said hot water and said coffee material into said extracting device.

3. A coffee extracting apparatus as claimed in claim 1, wherein said extracting device comprises:

a filter support for supporting a filter member which is for filtering said liquid coffee extract; and a chamber wall for defining, in cooperation with said filter member, an extracting chamber to which said hot water, said coffee material, and said compressed air are supplied.

4. A coffee extracting apparatus as claimed in claim 1, wherein said extracting device further comprises a seal member inserted between said filter support and said chamber wall.

* * * * *